United States Patent
Smith et al.

[11] 3,904,057
[45] Sept. 9, 1975

[54] LOG BUNDLE CONVEYOR

[75] Inventors: Robert L. Smith; Hugh Worthington, both of Seattle, Wash.

[73] Assignee: Products Engineering Co., Kent, Wash.

[22] Filed: Jan. 7, 1974

[21] Appl. No.: 431,418

[52] U.S. Cl. ............... 214/622; 214/1 PB; 214/89; 214/100
[51] Int. Cl.² .......................................... B65G 47/02
[58] Field of Search ............ 214/89, 707, 700, 137, 214/622, 15 D, 100, 85, 3, 1 P, 1 PA, 1 PB, 12; 198/218, 221, 225, 222

[56] References Cited
UNITED STATES PATENTS

| | | | |
|---|---|---|---|
| 569,976 | 10/1896 | Meath | 198/225 |
| 1,021,898 | 4/1912 | Shafto | 214/707 |
| 1,700,697 | 1/1929 | Draper | 214/1 PB |
| 1,771,285 | 7/1930 | Blackwood et al. | 214/85 |
| 2,778,164 | 1/1957 | Lasater et al. | 214/1 PB |
| 2,798,588 | 7/1957 | Jurgens | 214/15 D |
| 3,486,609 | 12/1969 | Rogers | 198/221 |
| 3,556,319 | 1/1971 | Holden | 214/1 Z |

*Primary Examiner*—Robert J. Spar
*Assistant Examiner*—Gary Auton

[57] ABSTRACT

A conveyor for transferring bundles of logs from or to a lower position, such as floating log raft, is disclosed and comprises a plurality of spaced apart track means. Each track means preferably comprises a lower portion, a mid portion connected therewith and extending upwardly and at an obtuse angle thereto, and an upper portion connected with the mid portion and extending upwardly and angularly until the same passes through a horizontal plane to a log bundle station. Each of the track means is disclosed as being of U-shape in section and a bundle carriage is provided with wheels, which travel between the legs of the U's and on the relatively lower flanges thereof. Each of the track means comprises two laterally spaced units. The log bundle station at the upper portion of the track means will support a bundle of logs against accidental discharge therefrom, position a bundle so the same can be picked up by a log bundle lift fork means, or deliver the logs to an off bearing conveyor.

The bundle carriage comprises log engaging first fork means mounted for travel on said track means and second fork means movable out of the path of the log bundle being conveyed by the first fork means and then into contact with the trailing end portion of such a bundle after the same has reached said bundle station at the upper portion of the track means. The second fork means also includes two separate fork means disposed in spaced relation in the direction of travel of the log bundle so the same can press against the forward and trailing ends of a bundle and thus provide the desired holding force so that the bundle bands can be removed from the bundle of logs. The second fork means are each provided with power actuated means for angularly moving the same.

The means to power move the log carriage up the track means comprises a power driven drum and sheave means leading the cable from the drum to the bundle carriage. The sheave means comprises sheaves spaced apart in the direction of travel of the pulled cables and with the sheaves alined for the cable to be supported thereby and for the cables to pass over the sheaves. One of said sheaves is located to be coaxial with the arcuate portion of the track means where the same arcs from its upward travel to its horizontal travel at its upper portion. With sheaves so located, the cable will disengage said sheaves as the bundle carriage travels therepast and then reengage the same as the bundle carriage travels in the opposite direction.

3 Claims, 5 Drawing Figures

LOG BUNDLE CONVEYOR

BACKGROUND OF THE INVENTION

1. Field of the Invention

The invention relates generally to the conveying of bundles of logs from a lower level (such as floating in a log raft on water) to a higher level having a station, where the log bundle may be removed by lift fork means as a unit, discharged as a unit by an off bearing conveyor, or the bundles may be unbanded and the logs handled as individual logs. Also, the conveyor may be used to provide a bundle of logs at the loading station at the upper level and then to lower the bundles of logs to a lower level, such as to provide a floating log raft on water.

2. Description of the Prior Art

Most of the prior art devices provided for the breaking up or unbanding of log bundles at the mill or other location where the logs were to be used and then handling the logs individually as separate units.

SUMMARY OF THE INVENTION

The present invention is characterized by track means up or down which bundles of logs, as compared to individual logs, may be skidded or slid sideways or at right angles to the direction of the axes of the logs. The track means are provided with three portions: lower, mid, and upper. Bundle carriage means, having log engaging fork means, travel up and down said track means. The lower track portion is vertically positioned so that the fork means can extend substantially horizontally and thus the draft or water level at the lower end of the track means may be a minimum and still the forks will be low enough in elevation so that a log raft may be floated in the position over said forks. Then the forks are raised up said vertical portion as they travel up the lower track portion. As such forks, carrying a bundle of logs move upwardly and over the mid track portion, the logs are urged rearwardly by gravity as such track portion is connected with the lower track portion at an obtuse angle. The bundle of logs is carried up and over the mid track portion until the upper portion is reached. Here the bundle moves from an upward travel angularly to and through a horizontal plane.

A discharge station is provided on the upper track portion. Here the log bundle will be at rest so that the log bundle may be removed as a unit by a suitably equipped lift fork means with tongs or the bundle may be delivered to an off bearing conveyor. Also, a second set of fork means are provided to engage the trailing end portion of the bundle or to squeeze the log bundle between two log fork means so that the bundle can be unbanded and the logs handled as individual units. Obviously, the sequence of operations discussed can be reversed and the device used as a log bundle handling means to lower bundled logs to a lower level, such as to float on a bed of water and to form parts of a log raft.

The details of the track means, associated parts, and the power structure to drag a bundle of logs up the track means, or lower such a bundle down the same, are most important in this invention. The track means comprises a plurality of laterally spaced units and each unit preferably comprises two individual tracks. Each individual track is U-shaped in section. The bundle carriage is supported by wheels, which operate between the legs of the U and such wheels run on the lowermost leg of a U. The bundle of logs is towed or dragged up the track means by a driven cable and alined sheaves are provided to support each cable. One of the sheaves is coaxial with the center of the arc of the track means in the upper section thereof and the cable rides over said sheave while the bundle raises to such elevation, then leaves said sheave, and on reversal of travel, the cable again rides over said sheave.

These and other objects and advantages of the present invention will become apparent and implicit from a consideration of the detailed description, when taken in conjunction with the accompanying drawings.

DESCRIPTION OF PREFERRED EMBODIMENTS

Figure 1:
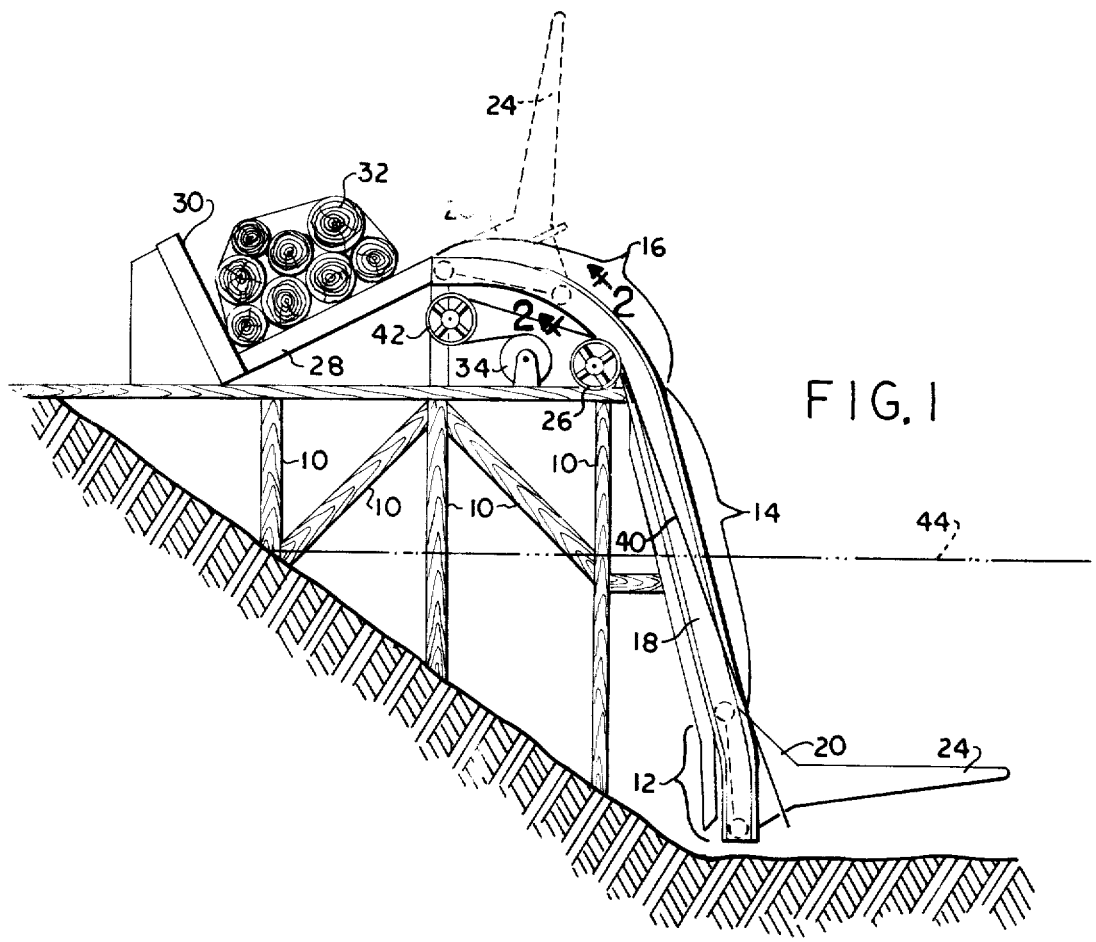
FIG. 1 is an elevational view of a structure embodying this invention.

Throughout the description of the device illustrated in the drawings, like reference numerals will refer to like parts. Also in the drawings, the structures are illustrated as positioned on a bank alongside a waterway and it is understood that such is merely illustrative of an environment where a device may be used and is not to be construed as a limitation.

Figure 3:
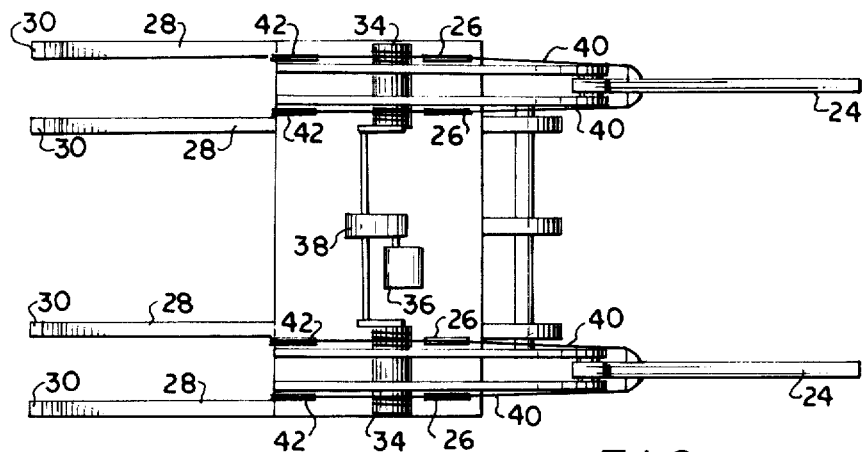
FIG. 3 is a plan view of the structure of FIG. 1 and with parts removed in the interest of clarity.
Figure 2:
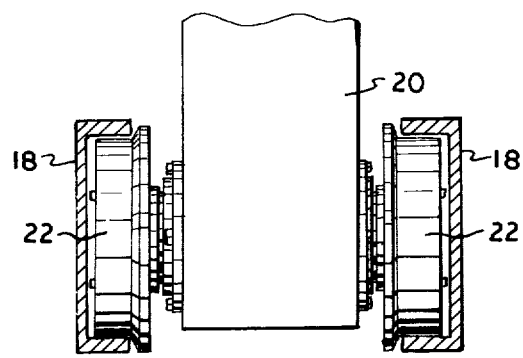
FIG. 2 is a sectional view, with parts in elevation, taken substantially on broken line 2—2 of FIG. 1.

Structural members 10 support track means having three portions: lower portion 12, mid portion 14, and upper portion 16. There are two laterally spaced apart track means 12, 14, 16 (see also FIG. 3) and each preferably comprises two tracks. Each track is U-shaped in section (see FIG. 2) and the legs 18 thereof are spaced apart. A log bundle engaging fork 24 projects from and is carried by the log bundle carriage 20. The log bundle engaging a fork 24 is secured to the bundle carriage 20 at an appropriate angle so that when the wheels 22 of the carriage 20 are disposed between the legs 18 of the lower track means 12, then the upper surface of said fork 24 lies substantially in a horizontal plane. As the fork 24 will often be used to permit a log raft to float thereover, the horizontal upper surface of the forks 24 provides for a minimum of interference and permits a shallow water draft and at the same time a maximum clearance between the upper surface of said fork 24 and the bottom of a log raft at any given water level.

As the upper wheels 22 rise and extend between the legs 18 of the track mid portion 14, then the upper surface of the forks 24 will be inclined to the horizontal due to the obtuse angle of the mid track portion 14 to the lower track portion 12. A portion of the weight of the log loaded bundle carriage 20 will now be shifted against the shoreside leg 18 of the mid track portion 14. This will remove any tendency for the log bundle to move forwardly and away from the mid track portion 14.

As the loaded bundle carriage 20 moves in the circular path involving the travel over the upper track means 16, it moves in part in an arc which is coaxial with the cable guide sheave 26. During this travel over the upper track portion 16, the weight of the log bundle 32 is shifted from the forks 24, to the bundle carriage 20, and finally to an upper log station, such as the downwardly inclined track means 28 and bundle stop means 30.

During the travel, just described, of the log bundle carriage 20, the short side or the lowermost leg of the U-shaped track means 12, 14, 16 will bear the weight of the log bundle carriage as the same is dragged by cable means, which will be shortly described. At the same time, the wheels 22 will be encloseed within the legs of the U-shaped channel, thus limiting access to debris from the logs. Also, the water side of the U-shaped track means 12, 14 16 will be smooth and otherwise adapted to have logs skidded thereagainst.

The means for dragging a log bundle 32 up, or lowering the same down, track means 12, 14, 16 comprises two helically grooved and interconnected drums 34, power driven by suitable power means, as electric motor 36, through suitable reduction gear mechanism 38. A cable (one on each side) is connected at one end with grooved drum 34 and wrapped a plurality of times therearound. Then, each cable 40 is reeved upwardly and about idler sheave 42 and thence to and connected at its other end portion with the log bundle carriage 20. When the log bundle carriage 20 is in the full line position of FIG. 1, then each cable 40 will be reeved over a cable guide sheave 26 but when the log bundle carriage 20 is in the dotted line position of said FIG. 1, then the carriage 20 has passed said sheave 26 and the cable 40 has also passed said sheave 26.

From the structure just described, it will now be obvious that a log bundle may be floated on water and over log bundle engaging forks 24, when the latter are in the position shown in FIG. 1. A water level is indicated by the line 44 to accomplish such purpose. As the cables 40 are wound on grooved drum 34 and cable is fed over sheaves 26 and 42, the log bundle engaging forks 24 will rise and the upper wheels 22 of each log bundle carriage 20 will move into the mid track portions 14 and the forks 24 will tilt relative to the horizontal. This will provide a force on a log bundle engaged by such forks 24 tending to urge the log bundle in the direction of the mid track portion 14. This will mitigate against the loss of ill balanced bundles moving away from track means 12, 14 as a bundle is elevated by the mechanism. As the log bundle passes the arcuate portion of the upper portion 16 of the track means, the weight of the log bundle is gradually transferred from the forks 24 to the inclined tracks 28 and finally also to the bundle stop 30. As the bundle passes the idle sheaves 26, the cables 40 will leave such sheaves but the sheaves 42 will continue to guide the cables 40.

When the bundle of logs is supported by inclined track means 28 and a bundle stop means 30, as indicated in FIG. 1, then such a bundle can be readily removed by lift truck means provided with suitable log engaging forks or tines. Also, such a lift truck can be employed to load a bundle of logs onto and be supported by the bundle engaging fork means 24, if it is desired to use the mechanism to lower a bundle of logs down the track means 14, 12.

As a first alternative construction for the loading station comprising the bundle stop means 30 of FIG. 1, the same may be replaced by an off bearing conveyor 46 (see FIG. 4) and an inclined ramp 48 may be employed to feed log bundles delivered from log engaging forks 24 thereto.

Figure 4:
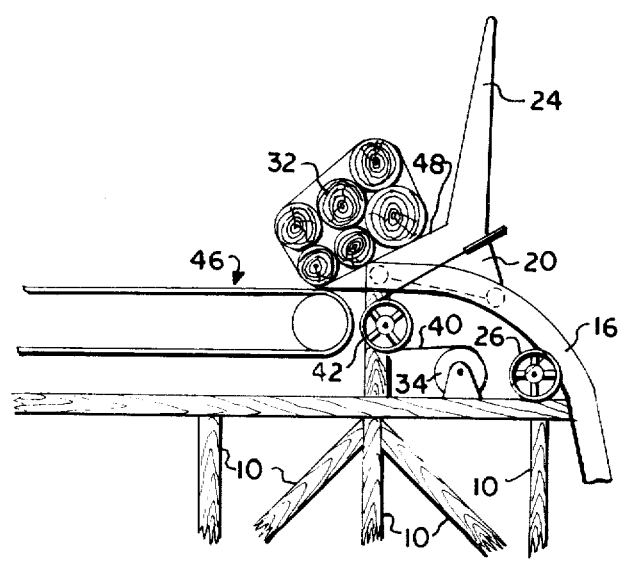
FIG. 4 is an elevational view of a modified form of the invention.
Figure 5:
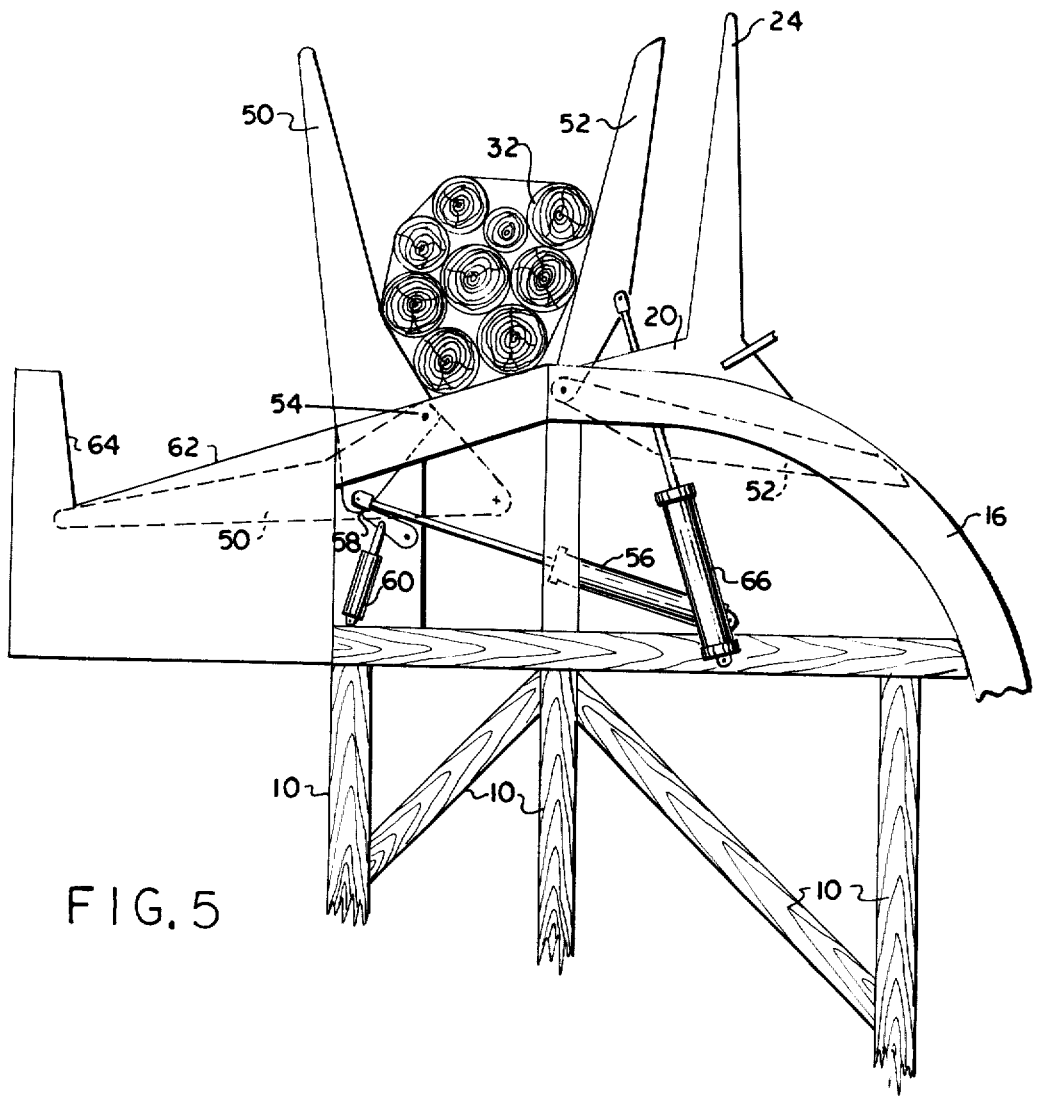
FIG. 5 is a view similar to FIG. 4 of a still further modified form.

As a second alternative construction for that shown in FIG. 4, second fork means may be employed and the same preferably comprise laterally spaced apart stopping fork means 50 and laterally spaced apart clamping fork means 52. Each stopping fork means 50 is pivotally mounted by pivot means 54 and is movable out of log bundle stopping position, as shown by dotted lines in FIG. 5, and into log bundle stopping position as shown by full lines in said FIG. 5. A means to power said fork means 50 selectively to said positions is illustrated by a hydraulically actuated means 56, having one end portion pivoted to the fork means 50 and the other end portion thereof pivoted to a structural member 10. Preferably, a pivoted catch 58 is operated by hydraulic means 60 so that the stopping forks 50 may be selectively locked into log bundle stopping position (full line position of FIG. 5) or out of log bundle stopping position (dotted line position shown in FIG. 5) and a log bundle can then be slid down spaced apart inclined tracks 62 and onto a conveyor (as conveyor 46 of FIG. 4) or against a stationary log stop means (as the log stop means 64).

If it is desired to unband a bundle of logs when the same is stopped by stopping fork means 50, then a clamping fork means 52 is employed. Clamping fork means 52 are movable out of the path of the bundle passing thereby by being moved to the dotted line position shown in FIG. 5. The clamping fork means 52 comprises laterally spaced apart forks and spaced so their movement is independent of and noninterfering with log bundle engaging fork means 24. The clamping fork means 52 are arranged so that after they have been moved to the full line position shown in FIG. 5 and clamped against the trailing end portion of a log bundle, the log engaging forks 24 may be retracted (as shown by full lines in FIG. 5). The means for moving clamping fork means 52 from the full line to the dotted line positions of FIG. 5 and the reverse thereof, is illustrated by hydraulic means 66 pivoted at one end portion to the clamping fork means 52 and at the other end portion to a structural member 10.

From the foregoing, it will now amply appear that there is provided two laterally spaced apart track means, each thereof embodying a lower track portion 12, a mid track portion 14 connected with said track portion 12 and extending upwardly and at an obtuse angle to the track portion 12, and an upper track portion 16 which connects with track portion 14 and extends upwardly and angularly therefrom until the track portion 16 passes to a slightly downwardly horizontal plane. The bundle carriage 20 is mounted on wheels 22 which are mounted for traveling movement on the track means 12, 14, 16. Log bundle lift arm means or forks 24 are carried by the log bundle carriage 20 and such arms or forks are disposed substantially in a horizontal plane when the bundle carriage is supported at the level of the lower track portion 12.

More particularly, the track means 12, 14, 16 comprises track means which are substantially U-shaped in section and the wheels 22 travel between the legs of the U-shaped track and are supported by the inner surface of one of the legs of the U-shaped track while the opposite surface of the wheels is in close proximity to the other leg of the U-shaped track. This construction eliminates substantially debris problem incident to the skidding of logs over track surfaces. Preferably, the two laterally spaced apart track means, each comprises two laterally spaced track units.

As the log bundles reach the top of the upper track means 16, they may be stored by resting on the inclined track means 28 of FIG. 1 and by resting against the bundle stop means 30 of said figure, or the same may be discharged onto the off bearing conveyor means 46 illustrated in FIG. 4.

The means to move the bundle carriage up the track means preferably comprises a driven, grooved drum 34, and alined sheave means 42 and 26 with a cable passing from the driven drum and over said sheave means and connected with the log carriage 20.

A third alternative way of handling the logs after they are to be discharged from the upper track portion 16 is by the use of second fork means movable into and out of the path of travel of the log bundles as they move to and from said upper track means 16. The second fork means preferably comprises stopping fork means 50 and clamping fork means 52. Stopping fork means 50 is moved into the path of travel of a bundle of logs so as to stop the traveling movement thereof and then movable out of such position to release the bundle or the logs from a bundle when desired. The clamping fork means 52 is movable out of the path of travel of a bundle of logs so that a bundle may move therepast and said clamping fork means 52 moves against the trailing end portion of the bundle of logs to squeeze and clamp the same against a stopping fork means 50. With a bundle of clamped logs so squeezed, then the bands holding the logs together can be readily removed to release and the logs properly handled during such an operation. Thereafter, the stopping fork means 52 can be moved out of the way and the individual logs released for delivery to other locations.

The stopping fork means 50 is preferably provided with a retractable catch means 58 so that said stopping fork means can be positively held in stopping position and selectively released as desired.

The means to drag or tow the log bundle carriage 20 and the load of logs thereon up the track means preferably comprises the power driven drums 34, one of which is disposed on either side so that we have spaced apart cables towing the log bundle carriage 20 up the track means. The cable means 40, each passes over an idle sheave 26 located at the center of the arc of the arcuate portion of the track means at the upper portion 16 and thus a cable 40 will engage with an idle sheave 26 during that portion of the travel of the carriage downwardly from the upper track means 16 to the lower track means 12 and then upon raising of the bundle carriage past the location of the cable guide sheaves 26, then the cables will leave such guide sheaves during further upward movement.

Obviously, changes may be made in the forms, dimensions and arrangements of the parts of this invention without departing from the principle thereof, the above setting forth only preferred forms of embodiment.

We claim:

1. A log bundle conveyor comprising laterally spaced track means extending generally upwardly and terminating in a plane extending generally horizontally; a bundle carriage having log-engaging fork means and mounted for travel on said track means, said fork means comprising a plurality of laterally spaced tines which engage a log bundle at laterally spaced locations for moving a bundle laterally; a pivotally mounted log-engaging second fork means movable into and out of the path of travel of the log bundles on said bundle carriage as they move past said second fork means, said second fork means comprises two separate means spaced apart with one in advance and one trailing in the direction of travel of the bundle carriage and at a distance to permit a bundle to be squeezed between said spaced fork means; and means to move said bundle carriage up said track means.

2. The combination of claim 1, wherein the trailing fork means is pivotally mounted and its movable portions are movable into and out of the path of travel of the bundle carriage to permit free passage thereby of said bundle carriage and the bundle thereon and the movable portions are thereafter movable to a position behind such a bundle.

3. The combination of claim 1, wherein the advance fork means is provided with retractable catch means for holding said fork means in bundle stopping relation.

* * * * *